Figure 1:
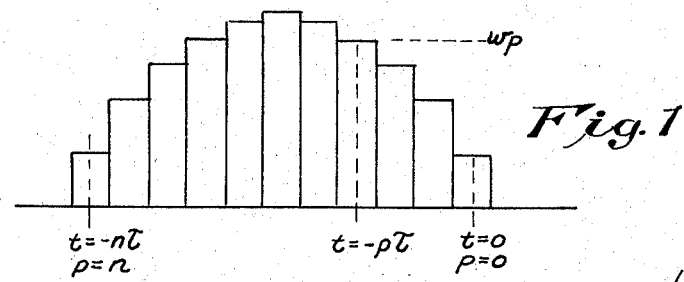

May 19, 1959 R. E. SPENCER 2,887,270
ANALOG COMPUTING APPARATUS TO EVALUATE THE RATE OF CHANGE
OF ONE VARIABLE WITH RESPECT TO ANOTHER
Filed Jan. 24, 1951

INVENTOR:
R. E. SPENCER,

BY *Glascock Downing Seebold*
ATTORNEYS

2,887,270

ANALOG COMPUTING APPARATUS TO EVALUATE THE RATE OF CHANGE OF ONE VARIABLE WITH RESPECT TO ANOTHER

Rolf Edmund Spencer, West Ealing, London, England, assignor to Electric & Musical Industries Limited, Hayes, Middlesex, England, a British company Application January 24, 1951, Serial No. 207,490

Claims priority, application Great Britain February 2, 1950

9 Claims. (Cl. 235—184)

This invention relates to computing apparatus.

In some forms of computing apparatus, such for example as predictors, a number of observations of a variable (for example, a displacement) are made either continuously or at discrete intervals of another variable, usually time, and the observations are utilised to evaluate the rate of change of the first variable with respect to the second variable (i.e. the velocity if the first variable is a displacement and the second variable is time). However, difficulty arises because the observations are usually subject to random errors which can lead to significant inaccuracy in the evaluated rates. In order to reduce these errors it has been proposed to smooth either the observations themselves or the rates evaluated therefrom and it is often desirable to smooth the observations in such a way as to reduce to a minimum the root means square (R.M.S.) deviation between the actual observations and the ideal set of observations represented by the smoothed rate. Smoothing is, moreover, often referred to as applying a weighting function since, in effect, the evaluation is weighted more in favor of some observations than of others. In other words, assuming the second variable to be time, each of the observations taken into account in the rate evaluation process is multiplied by the corresponding particular value of a function of time, termed the weighting function. If the weighting function has to satisfy the minimum R.M.S. criterion and the observations are made continuously, it can be shown that the desired weighting function is accurately parabolic and has the value zero at time $t=t_0$ (the present time) and at times $t_0-T$ and earlier, where T is the weighting period, that is the period or interval over which the rate is evaluated. When the observations are made at discrete intervals a rate weighting function having the form shown in Figure 1 of the accompanying drawing is required. In this figure the distance between successive vertical lines indicates the interval $(\tau)$ between successive observations and there are $(n+1)$ of them, the magnitude of the weighting function for an observation at time $t=p.\tau$ is $p(n-p)$ which is denoted by $w_p$. This function reduces to the parabolic case when $n$ becomes very great. Such rate weighting functions reduce to a minimum the effect of purely random errors in the observations of the first variable. However, difficulty is encountered in practice in achieving these weighting functions, especially as regards maintaining the function zero at times earlier than the intended weighting period and thus rejecting "stale" information. It will be appreciated that if it is intended to take into account, in the evaluation, observations within a restricted interval and the weighting function is not zero outside the interval, then observations made outside the interval will affect the evaluation since the product of the observations and the weighting function will not be zero.

This difficulty may be particularly serious at the beginning of a series of observations since in this case at the time $t=t_0-T$ or $t=-n\tau$ in the above examples the observations may not represent the true values of the first variable. For example if the apparatus concerned is an anti-aircraft predictor in which the position of the target is being recorded by radar or optical or other tracking means some time must elapse before the tracker has settled on to the target and early observations will represent this settling process and not the positions of the target. This involves a loss of valuable time and it will be seen that not only is it desirable that the weighting function should be zero for all times earlier than $t=t_0-T$ or $t=-n\tau$ in the above examples but that further it would be desirable for the weighting period to be capable of being shortened and subsequently progressively increased, so that all observations earlier than a specified time can be ignored, irrespective of whether they are earlier than $t=t_0-T$ or $t=-n$. The shape of the weighting function should, however, be preserved during this shortening process.

Similar difficulty may arise where other forms of weighting function are used and the main object of the present invention is to reduce the difficulties aforesaid.

According to the present invention, there is provided computing apparatus for evaluating the rate of change of one variable with respect to a second variable, comprising an auto-transformer, impedances leading to taps on said auto-transformer representing values of said second variable, means for applying alternating current voltages to said impedances with amplitudes representative of values of said first variable for the values of the second variable represented by the corresponding taps, said auto-transformer having a high shunt impedance dimensioned to produce a voltage gradient along said auto-transformer in response to said voltages representative of a smoothed rate of change of said first variable with respect to the second variable.

The voltages set up at the points on the auto-transformer represent smoothed values of the first variable by reason of the tight mutual coupling of the turns of an auto-transformer (as will be explained subsequently) and, on arranging that the impedances leading to said points are equal resistances, it can be shown that the root mean square deviation between the observed values of the first variable, as represented by the alternating current voltages, and the smoothed values is approximately a minimum so that the apparatus automatically applies a weighting function of the form shown in Figure 1. Moreover, the shape of the weighting function is preserved for any number of applied alternating voltages provided that the number is not less than a predetermined minimum which, as will appear subsequently, depends upon the construction of the auto-transformer. Therefore, by providing switches between the impedances and the points on the potentiometer, the weighting interval can be varied in a desired manner.

Preferably, apparatus in accordance with the present invention has means for displacing said taps cyclically along the auto-transformer, in which case the voltage applying means may comprise voltage stores which receive alternating current voltages representing successive discrete values of said first variable as the corresponding taps arrive successively at a predetermined point during each scanning cycle. This feature allows continuous computation of the rate of movement of an object, the displacement of the taps representing variations in the second variable, in this case time.

Figure 2:
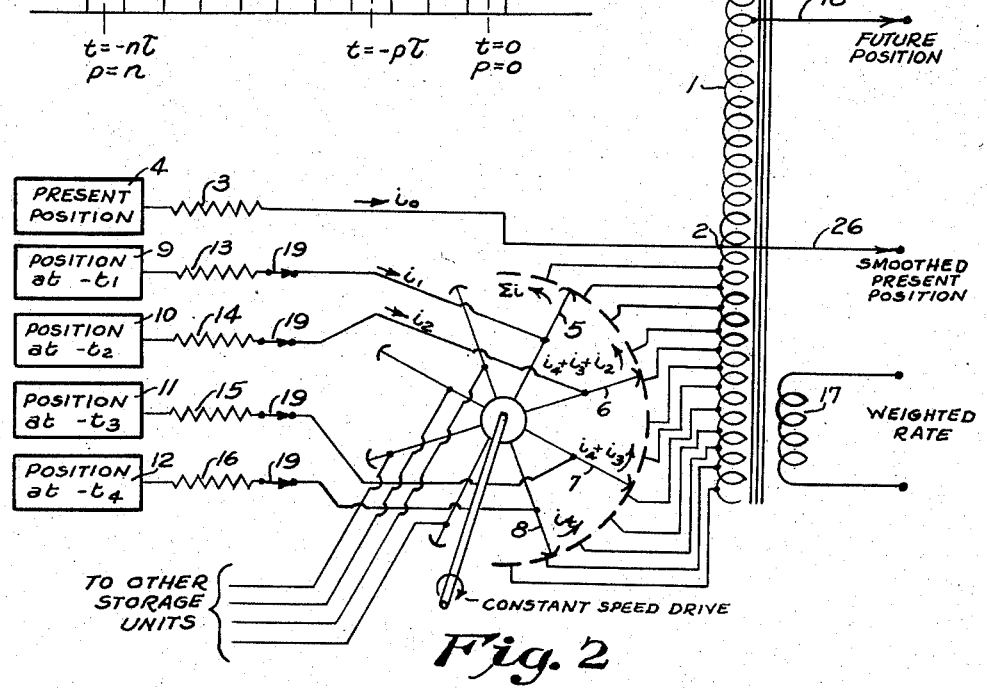
Figure 3:
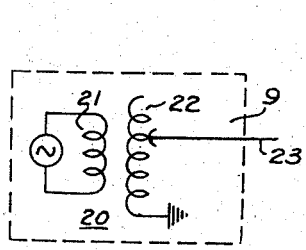
Figure 4:
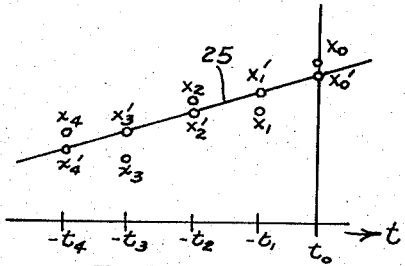

In order that the said invention may be clearly understood and readily carried into effect, the same will now be more fully described with reference to the accompanying drawing, of which Figure 1 has already been referred to and Figure 2 illustrates one application of the present invention, Figure 3 is a detailed view of part of Figure 2 and Figure 4 is a graph explanatory of the operation of Figure 2.

Referring to Figure 2, the apparatus illustrated comprises a tightly coupled inductive auto-transformer 1 of very high shunt impedance which is not tied to any fixed reference auto-transformer. The tap 2 of the potentiometer is connected by a resistance 3 to a voltage source 4 at which is set up, on operation of the apparatus, a voltage representative of the present value of a variable, say a displacement $x$. A series of sliding contacts, of which four are shown and denoted by the references 5 . . . 8, are arranged to traverse the auto-transformer virtually in the downward direction as seen in the drawing, which is taken as the negative direction though, as shown, the displacement is effected by a clockwise rotation of a shaft carrying the contacts. The number of sliding contacts used in practice will in general be much larger than four. The contacts 5 to 8 are fed via resistances 13 . . . 16 from storage units 9 . . . 12 with A.C. voltages whose amplitudes are representative of observations of $x$ at different instants, as hereinafter described. Each of the storage units may be of the construction described in my earlier filed British specification No. 2,434 of 1950 (complete specification filed January 19, 1951) and in the corresponding co-pending United States application Serial No. 208,297, filed January 29, 1951. Those specifications describe apparatus for setting up an alternating voltage having an amplitude representative of the value of a variable at any desired instant. The described apparatus comprises a series of electrical relays which control a series of electrical switches. The switches in turn control the number of turns in a transformer secondary winding so that the amplitude of the alternating current voltage set up across said winding, assuming that a reference voltage is applied to the primary winding, is representative of the combined states of the relays. The relays are coupled to a selector which is movable to represent the variable being observed and the apparatus is such that, at any described instant when it is required to sense the value of the variable, a sensing pulse is applied to the selector and the couplings from the selector to the relays are such that the relays are set in a combination of states uniquely related to the position of the selector. For the purposes of illustration in the present case, one of the storage units, say the storage unit 9, is represented in Figure 3 and, for simplicity, the storage unit shown in Figure 3 is represented merely as a transformer 20 having a primary winding 21 energized with a reference voltage and a secondary winding 22. The output from the winding 22 is taken from a sliding tap 23, the tap 23 being set each time observation has to be stored so that the number of effective turns in the secondary winding is representative of the instantaneous value of $x$. It will be appreciated that the tap is illustrative of the function of the series of relay-controlled switches disclosed in my said earlier British application and it is set to a new position virtually instantaneously at any time when it is required to store an observation in the respective storage unit. The alternating voltage output from the tap 25 is the voltage which is applied to the resistance 13 and its amplitude is representative of the value of $x$ at the corresponding time of observation.

Movement of the contacts 5 . . . 8 is such that their linear distances from the centre point 2 of the auto-transformer are representative of the time which has elapsed since the respective observations were made. As the sliding contact 8 moves off the lower end of the auto-transformer 1, a further sliding contact commences to scan the auto-transformer from the point 2 following the contact 5, and so on. After a contact moves off the lower end of the auto-transformer the storage unit (9 . . . 12) to which it is connected is returned to the point 2 in readiness for a further traverse. During said return movement, the contact is open-circuited and any voltage applied to it from the respective storage device does not enter into the evaluation. Moreover, as each contact commences to traverse the auto-transformer, a voltage signal representative of the present value of $x$ is fed to the corresponding storage unit and stored therein during the traversing movement. In the form of storage unit described in my co-pending United States application Serial No. 208,297 aforesaid, the clearance of the store, that is the sections 23 to 28 of the transformer shown in Figure 2 of the prior application, occurs on feeding in a new voltage signal, the time at which a new voltage signal is fed in being determined by the pulses from the source 15 shown in Figure 1 of the prior application. During traversing the voltage fed to the respective contact is representative of the value of $x$ at the past time represented by the position of said contact. In Figure 2 these times are denoted by $-t_1$, $-t_2$, $-t_3$ and $-t_4$. The resistances 3 and 13 . . . 16 are equal. Means may furthermore be provided whereby at the commencement of a series of observations of $x$ the sliding contacts 5 . . . 8 are disconnected from the voltage sources 9 . . . 12 purporting to store past values of $x$ and only become connected to these sources as they reappear at the point 2 after the time when observations of the magnitude $x$ actually commence, so that any voltages which are then fed to the contacts are truly representative of past values of $x$. Such means are indicated in the drawing as switches 19 in the leads to the contacts 5 . . . 8.

The operation of the apparatus is illustrated by the graph in Figure 4, in which the abscissae represent time and the ordinates represent alternating voltage amplitude. Assume that the variable $x$ has a constant rate of change but that the observations of $x$ are subject to irregularities and that these irregularities manifest themselves in the amplitudes of the alternating voltage analogue representing successive values of $x$. In Figure 4, the amplitudes of the analogue applied to the auto-transformer 1 from the source 4 and the storage units 9 to 12 are denoted by $x_0$, $x_1$ . . . $x_4$, the analogue being, of course, representative of the observations of $x$ at the times $t_0$, $-t_1$ . . . $-t_4$ and the assumption being that all the voltage analogues have the same phase. Due to the tight coupling of the auto-transformer, the voltage amplitudes at different points along the auto-transformer are constrained to vary according to a linear law and the straight line 25 represents the variation of voltage amplitude along the auto-transformer. The voltage amplitude at the point 2 is denoted by $x'_0$, the voltage amplitude at the contact 5 is denoted by $x'_1$, the voltage amplitude at the contact 6 is denoted by $x'_2$, and so on. Furthermore, due to the tight coupling of the auto-transformer and its high shunt impedance (which should theoretically be infinite), the voltage gradient along the auto-transformer, that is the gradient of the line 25, automatically adjusts itself in such a way that the R.M.S. deviation between the set of values $x'_0$ . . . $x'_4$ corresponding to the smoothed voltage gradient and the observed values $x_0$ . . . $x_4$ is a minimum. Therefore the apparatus illustrated automatically applies a rate weighting function of the desired shape and moreover, automatically and positively rejects all information which is older than the intended weighting period. The applied weighting function is a stepped function as shown in Figure 1 and approaches more and more closely to a parabolic function as the number of sliding contacts such as 5 . . . 8 is increased. An output representative of the weighted rate is obtained from a secondary winding 17 since the voltage amplitude across the secondary winding 17 will vary as the voltage gradient along the auto-transformer 1. Moreover, a voltage representative of the smoothed present value of $x$ can be obtained via lead 26 from the tap 2 and of the value of $x$ at a desired time in the future from a sliding contact 18. For example, assuming the invention is employed in a predictor, the weighted rate signal derived from the secondary winding 17 may be multiplied by the time of flight of a shell and the product added to the smoothed present position signal derived from lead 26 and the resultant employed as a gun-laying signal. The output from the tap 18 can be employed to give an indication of the predicted course of the target.

The theoretical basis of the invention can be allustrated by assuming that $x_0, x_1 \ldots x_n$ represents the amplitudes of a series of alternating voltage analogues observed at times $t_0, t_1 \ldots t_n$. Let $a, a+v, a+2v \ldots a+nv$ be a set of voltage amplitudes at times $t_0, t_1 \ldots t_n$ smoothed to produce an arbitrary constant rate of change. The deviation between any value of $x_r$ and the corresponding smoothed value is $x_r - a - rv$ and will be denoted by $\delta_r$. The criterion for minimum root mean square deviation is that $$\sum_{r=0}^{n} \delta_r^2 = \sum_{r=0}^{n} (x_r - a - rv)^2$$

should be a minimum.

Differentiating partially with respect to $a$ and $v$:

$$\sum_{r=0}^{n} (x_r - a - rv) = 0$$

and $$\sum_{r=0}^{n} r(x_r - a - rv) = 0$$

Therefore, the criterion for minimum root mean square deviation is $$\sum_{r=0}^{n} \delta_r = 0$$

and $$\sum_{r=0}^{n} r\delta_r = 0$$

In the arrangement shown in Figure 2, it is assumed that the mutual coupling between the turns of the auto-transformer is sufficiently tight to maintain a linear voltage gradient along the auto-transformer. Therefore, assuming equal spacing between the sliding contacts, the voltage $x'_0, x'_1, x'_2 \ldots$ at the taps can be represented by $a, a+v, a+2v \ldots$ Let $i_r$ be the current through the resistor to the $(r+1)$th tap on the potentiometer. In that case, $\delta = i_r R$ where each of the resistances has the value R. Starting from the bottom, the currents in the sections of the auto-transformer between the sliding contacts are as shown. Since the auto-transformer is floating, it is apparent that $i_0 = -(i_1+i_2+i_3+i_4)$ or in the general case that $$\sum_{r=0}^{n} i_r = 0$$

and hence $$\sum_{r=0}^{n} \delta_r = 0$$

The first condition for minimum root mean square deviation is therefore satisfied. Moreover, if the output current of the arrangement is zero or, in other words, if the ampere turns of the auto-transformer 1 are zero, $$\sum_{r=0}^{n} r i_r = 0$$

and hence $$\sum_{r=0}^{n} r\delta_r = 0$$

This follows from the fact that $i_4$, say, flows in four sections of the auto-transformer, $i_3$ flows in three sections, and so on. This is the second condition for minimum root mean square deviation and would be met if the shunt impedance of the auto-transformer were infinite.

It is not, of course, possible in practice to make the shunt impedance infinite and therefore the ampere turns zero, but the condition is sufficiently approached for practical purposes by arranging that the auto-transformer 1 have a high shunt impedance. The voltage gradient set up along the auto-transformer is, therefore, within the limits of practical error, respresentative of the desired smoothed rate of change of $x$.

The number of sliding contacts moving in the negative direction may of course be varied. The potentiometer shown has two degrees of freedom, that is to say the mean potential of the potentiometer and also the potential gradient along it may vary and provided the total number of sources of observations exceeds the number of degrees of freedom, the potentiometer will automatically settle in such a way as to make the R.M.S. deviation of the gradient a minimum. The number of degrees of freedom of the potentiometer may, however, be increased by introducing transformer windings between the points 2, 5 . . . 8 and the resistances 3, 13 . . . 16 respectively, the number of turns on the respective windings being varied according to a quadratic, cubic or some other desired law. It is also possible to control within wide limits the applied weighting function, by varying the values of the resistances 3 and 13 . . . 16. For instance the value of the resistance in series with the source 4 controls the weight applied to the present information, and by using resistances effectively increasing with past time, the weighting function can be biased towards more recent information. Moreover, by applying switching techniques the weighting function can be changed from one to another instantaneously.

What I claim is:

1. Computing apparatus for evaluating the rate of change of one variable with respect to a second variable, comprising a tightly coupled auto-transformer, impedances leading to points on said auto-transformer representing values of said second variable, means for applying alternating current voltages to said impedances with amplitudes representative of values of said first variable for the values of the second variable represented by the corresponding points, said auto-transformer having a high shunt impedance to produce a voltage gradient along said auto-transformer in response to said voltages representative of a smoothed rate of change of said first variable with respect to the second variable.

2. Computing apparatus for evaluating the time rate of change of a variable, comprising a tightly coupled auto-transformer, a series of contacts spaced to represent intervals of time, means for displacing said series of contacts along the auto-transformer repetitively, impedances leading to said contacts, a series of voltage stores for applying voltages to said impedances, one store corresponding to each contact, and means for setting up in each store an alternating voltage having an amplitude representative of the instantaneous value of the variable on each engagement of the corresponding contact with a predetermined point on said auto-transformer, the auto-transformer having a high shunt impedance to produce a voltage gradient along the auto-transformer in response to said voltages representative of a smoothed rate of change of said variable.

3. Apparatus according to claim 2 comprising switch means for selectively disconnecting said voltage stores from the corresponding contacts, whereby inaccurate voltages set up in said stores during an initial settling period of said apparatus are ineffective.

4. Apparatus according to claim 2 comprising an extension of said auto-transformer from said fixed point in the direction opposite to the direction of displacement, whereby predicted future values of said variable can be derived from said extension.

5. Computing apparatus for evaluating the rate of change of one variable with respect to a second variable, comprising a tightly coupled auto-transformer, resistances leading to points on said auto-transformer representing values of said second variable, and means for applying alternating current voltages to said resistances with amplitudes representative of values of said first variable for the values of the second variable represented by the corresponding points, said auto-transformer having a high shunt impedance to produce a voltage gradient along said auto-transformer in response to said voltages representative of the rate of change of said first variable with respect to the second variable so smoothed as to make the root mean square of random errors in the values of said first variable substantially a minimum.

6. Apparatus for evaluating the time rate of change of a variable, comprising a tightly coupled auto-transformer, a series of contacts spaced to represent intervals of time, means for causing relative movement between said contacts and said auto-transformer to produce effective scanning of the auto-transformer by said contacts, impedances leading to said contacts, and means for applying alternating current voltages to said impedances with amplitudes representative of said variable at instants corresponding to the location of the corresponding contacts on the said auto-transformer, said auto-transformer having a high shunt impedance to produce a voltage gradient along said auto-transformer in response to said voltages representative of a smoothed rate of change of said variable.

7. Apparatus for evaluating the time rate of change of a variable, comprising a tightly coupled auto-transformer, a series of contacts spaced to represent intervals of time, means for causing relative movement between said contacts and said auto-transformer to produce effective scanning of said auto-transformer by said contacts, equal resistances leading to said contacts, and means for applying alternating current voltages to said impedances with amplitudes representative of values of said variable at instants corresponding to the location of the corresponding contacts of said auto-transformer, said auto-transformer having a high shunt impedance to produce a voltage gradient along said auto-transformer in response to said voltages representative of the rate of change of the variable so smoothed as to make the root mean square of random errors in the values of the variable substantially a minimum.

8. Apparatus according to claim 7 comprising switch means for selectively disconnecting said contacts from the means for applying said voltages.

9. Computing apparatus for deriving a smoothed rate of change of one variable with respect to a second variable, comprising means for setting up a series of alternating voltages having amplitudes representative of the values of said first variable for different values of said second variable, a system of intercoupled transformer windings, and means for applying said voltages to points on said intercoupled windings representative of said different values of said second variable.

References Cited in the file of this patent
UNITED STATES PATENTS

| | | |
|---|---|---|
| 2,435,195 | Bomberger | Feb. 3, 1948 |
| 2,474,074 | Sunstein | June 21, 1949 |
| 2,492,351 | Bode | Dec. 27, 1949 |
| 2,578,299 | Harrison | Dec. 11, 1951 |